United States Patent
Kawabe et al.

[11] Patent Number: 6,166,722
[45] Date of Patent: Dec. 26, 2000

[54] PORTABLE ELECTRONIC APPARATUS HAVING POINTING DEVICE

[75] Inventors: Shin Kawabe; Hideto Iwamoto, both of Tokyo, Japan

[73] Assignee: Mitsubishi Denki Kabushiki Kaisha, Tokyo, Japan

[21] Appl. No.: 08/853,474

[22] Filed: May 9, 1997

[30] Foreign Application Priority Data

Oct. 29, 1996 [JP] Japan .................................. 8-286885

[51] Int. Cl.⁷ .................................................. G09G 5/08
[52] U.S. Cl. .......................... 345/169; 345/163; 345/168; 361/684; 361/686; D14/318
[58] Field of Search .................................. 345/169, 163, 345/507, 137, 164, 157, 158, 159, 173; 361/680–686; 708/139, 140; 463/37; 273/148 B; 348/734; D14/318, 319, 320, 325

[56] References Cited

U.S. PATENT DOCUMENTS

| | | | |
|---|---|---|---|
| 5,049,863 | 9/1991 | Oka | 340/710 |
| 5,126,955 | 6/1992 | Tomoda | 364/708 |
| 5,235,328 | 8/1993 | Kurita | 340/825 |
| 5,287,246 | 2/1994 | Sen | 361/683 |
| 5,341,421 | 8/1994 | Ugon | 380/4 |
| 5,396,400 | 3/1995 | Register et al. | 361/686 |
| 5,426,564 | 6/1995 | Hsn | 361/707 |
| 5,428,355 | 6/1995 | Jondrow et al. | 341/20 |
| 5,490,039 | 2/1996 | Helms | 361/683 |
| 5,546,310 | 8/1996 | Ehdaie et al. | 701/207 |
| 5,546,334 | 8/1996 | Hsieh et al. | 364/709 |
| 5,550,561 | 8/1996 | Ziarno | 345/163 |
| 5,563,630 | 10/1996 | Tsakiris et al. | 345/160 |
| 5,563,631 | 10/1996 | Masunaga | 345/169 |
| 5,579,496 | 11/1996 | Van Steenbrugge | 395/567 |
| 5,637,018 | 6/1997 | Gargiulo | 439/640 |
| 5,675,360 | 10/1997 | Takegoshi et al. | 345/167 |
| 5,708,562 | 1/1998 | Agata et al. | 345/169 |
| 5,708,840 | 1/1998 | Kikinis et al. | 395/800 |
| 5,719,799 | 2/1998 | Isashi | 364/705 |
| 5,745,345 | 4/1998 | Deguchi | 361/741 |
| 5,793,355 | 8/1998 | Youens | 345/157 |
| 5,805,118 | 9/1998 | Mishra et al. | 345/1 |
| 5,825,614 | 10/1998 | Kim | 361/683 |
| 5,914,706 | 6/1999 | Kono | 345/173 |
| 5,920,306 | 7/1999 | Kikinis | 345/158 |
| 5,948,047 | 9/1999 | Jenkins et al. | 708/141 |

FOREIGN PATENT DOCUMENTS

| | | |
|---|---|---|
| 3-27411 | 2/1991 | Japan . |
| 3-189712 | 8/1991 | Japan . |
| 4-38685 | 3/1992 | Japan . |
| 5-23276 | 3/1993 | Japan . |
| 5-62066 | 8/1993 | Japan . |
| 5-298017 | 11/1993 | Japan . |
| 6-48045 | 6/1994 | Japan . |

OTHER PUBLICATIONS

Patent Abstracts of Japan, Japanese Patent Document No. 4–154198, May 1992.
Patent Abstracts of Japan, Japanese Patent Document No. 5–225771, Sep. 1993.
Patent Abstracts of Japan, Japanese Patent Document No. 6–102967, Apr. 1994.
Patent Abstracts of Japan, Japanese Patent Document No. 6–139415, May 1994.
Patent Abstracts of Japan, Japanese Patent Document No. 8–096896, Apr. 1996.
Patent Abstracts of Japan, Japanese Patent Document No. 8–180144, Jul. 1996.

*Primary Examiner*—Lun-Yi Lao
*Attorney, Agent, or Firm*—Burns, Doane, Swecker & Mathis, LLP

[57] ABSTRACT

Portable electronic apparatus is effectively provided with a pointing device and a memory card to allow it to be down-sized and made thinner. The portable electronic apparatus comprises an apparatus main body having a storage section for storing the pointing device, the storage section being provided in the inside with a connector for connecting a memory card to the apparatus main body. The pointing device is slid upward to produce a memory card fitting space for fitting the memory card in position within the storage section.

11 Claims, 10 Drawing Sheets

PORTABLE ELECTRONIC APPARATUS HAVING POINTING DEVICE

BACKGROUND OF THE INVENTION

1. Field of the Invention

This invention relates to a portable electronic apparatus adapted by installation of a pointing device and a memory card therein and, more particularly, to an improvement to a portable electronic apparatus having a pointing device and adapted to down-sizing and thinning.

2. Description of the Related Arts

In the current trend of developing highly capable and versatile electronic apparatuses including portable personal computers and portable terminal units, the main body of such apparatus is often equipped with a pointing device that is a sort of input device and a memory card slot for receiving a memory card that is an external memory. Two types of pointing devices are known to date. One represents devices that are independent from the main body and connected thereto by means of cable whereas the other represents devices that are arranged within the main body. Typical examples of the former and latter types are respectively a mouse and a sensor pad comprising a track ball or a pressure sensor.

Figure 1:
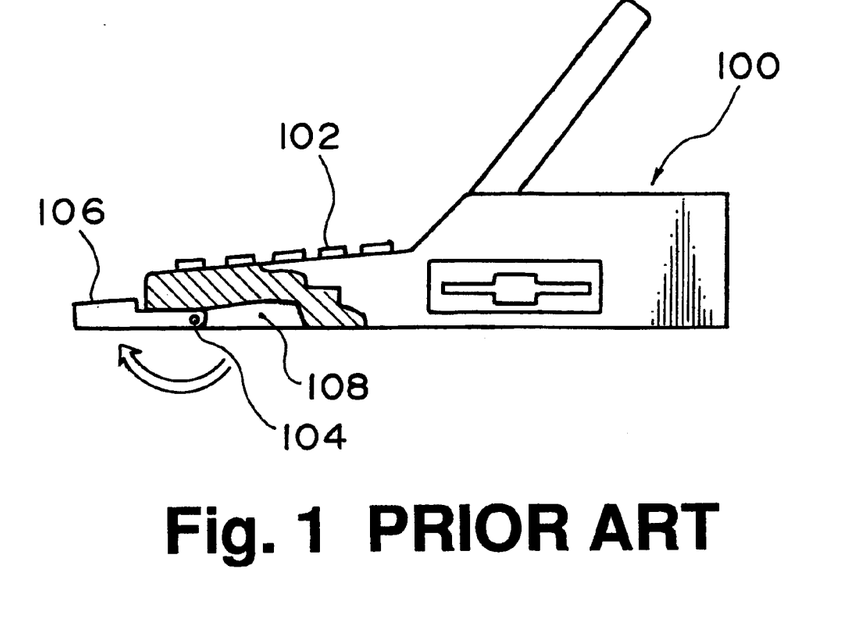
FIG. 1 schematically illustrates a known electronic apparatus having a pointing device.
Figure 2:
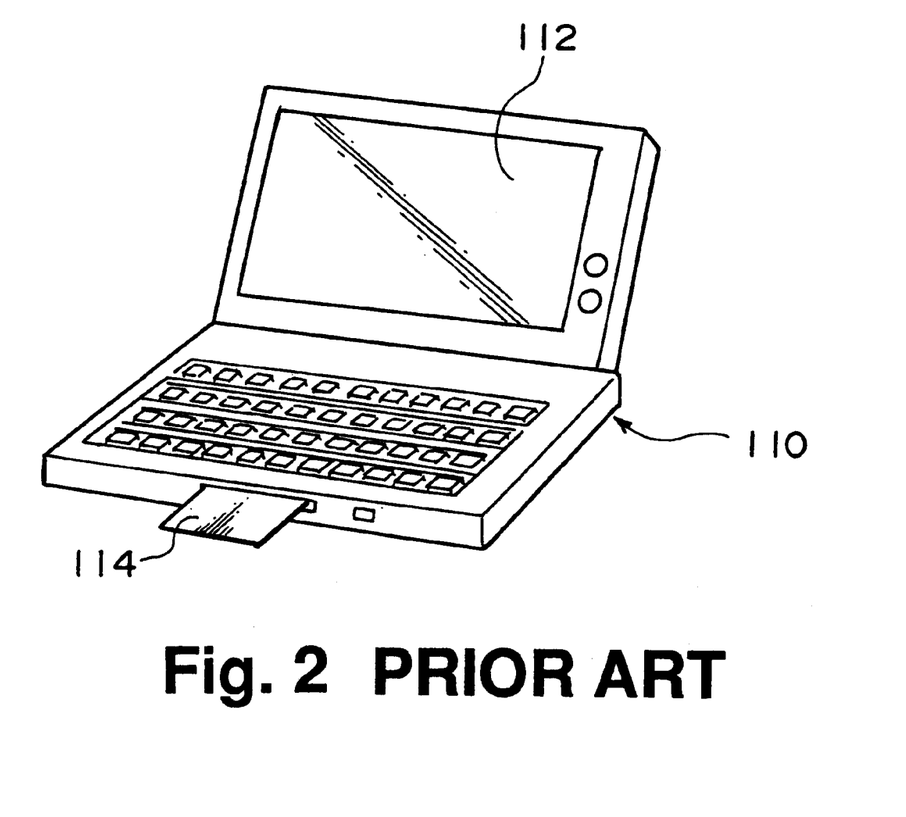
FIG. 2 schematically illustrates another known electronic apparatus having a pointing device.

FIGS. 1 and 2 of the accompanying drawings illustrate pointing devices arranged within the main bodies of respective electronic apparatuses. FIG. 1 shows a laptop type personal computer having a pointing device disclosed by Japanese Patent Laid-Open Publication No. Hei 3-189712. As shown in FIG. 1, the electronic apparatus 100 is provided with a pointing device 106 pivotably fitted by hinge 104 to the backside of keyboard 102 arranged on the main body. When the pointing device 106 is used, it is rotated by 180° toward the operator (front side). When it is not used, it is stored in storing section 108 where it is flush with the bottom of the electronic apparatus 100. Thus, the electronic apparatus 100 provides a significant improvement over comparable apparatus in terms of portability and aesthetics.

FIG. 2 shows a laptop type personal computer disclosed by Japanese Patent Laid-Open Publication No. Hei 5-298017. The electronic apparatus 110 is provided with a pointing device 114 that moves a cursor on display 112 when the user touches the surface of a pad comprising a pressure sensor with a finger tip. When the pointing device 114 is not used, it is stored in a storing space within the main body. When it is used, it is made to project frontward to its operating position, typically by means of a spring. In this instance again, the pointing device 114 is stored in the main body of the electronic apparatus 110 when it is not used so that the latter provides a significant improvement over comparable apparatuses in terms of portability and aesthetics.

Electronic apparatuses of the type under consideration are typically adapted to accommodate a memory card for functional upgrading, if necessary. Japanese Patent Laid-Open Publication No. Hei 3-27411 discloses a novel memory card slot with which the main body of an electronic apparatus can be provided without requiring any additional space in the main body.

Hitherto, however, pointing devices and/or memory cards slots are separately arranged in the main body of an electronic apparatus so that each requires a specific space, thereby thwarting, at least partially, efforts for down-sizing and thinning such electronic apparatus, which may be a portable personal computer or a portable terminal unit. Particularly in the case of a memory card to be added to electronic apparatus, this represents an inefficient use of a space provided in the main body of the electronic apparatus because it is not subjected to frequent use.

SUMMARY OF THE INVENTION

In view of the above identified problems, it is therefore the object of the present invention to provide portable electronic apparatus adapted to receive a memory card and having a pointing device so that the apparatus may be adapted to further down-sizing and thinning.

According to the invention, the above object is achieved by providing portable electronic apparatus having a pointing device, said apparatus comprising a storage section arranged in the apparatus main body for storing the pointing device, a support mechanism for movably supporting said pointing device and a connector arranged on the inner wall of said storage section for removably connecting a memory card to it, said pointing device being movable within said storage section in order to provide a fitting space for fitting said memory card to said connector.

With such an arrangement, the space produced by moving the pointing device supported by the support mechanism within the storage section can be used for fitting a memory card in position. In other words, the space can be commonly shared by both the pointing device and the memory card in order to reduce the overall necessary space within the apparatus so that the portable electronic apparatus may be adapted to further down-sizing and thinning.

Preferably, in portable electronic apparatus according to the invention, the pointing device provides a fitting space for fitting said memory card by moving a slide of the device.

With this arrangement, fitting space is produced for a memory card simply by moving the slide of the pointing device to simplify the operation of fitting a memory card in position.

Preferably, in portable electronic apparatus according to the invention, said support mechanism comprises a pop-up mechanism for sliding the pointing device with a pop-up motion.

With this arrangement, the operation of fitting a memory card in position is further simplified because a fitting space is produced for a memory card simply by popping up the slide for a sliding motion.

According to the invention, there is also provided portable electronic apparatus having a pointing device, said apparatus comprising a storage section arranged in the apparatus main body for storing the pointing device and a connector arranged on the inner wall of said storage section for removably connecting a memory card to it, said pointing device being detachable from the apparatus main body in order to provide a fitting space for fitting said memory card to said connector.

With such an arrangement, a storage space is produced for a memory card by removing the pointing device from the storage section to facilitate the operation of fitting a memory card in position and confirming the connection of the memory card and the connector.

Preferably, the apparatus main body has an external connector located outside said storage section for connecting the pointing device to the connector, and said pointing device can be connected to said external connector at the time of fitting the memory card in position.

With this arrangement, the pointing device removed from the storage section is connected to the external connector to completely separate the pointing device from the produced memory card fitting space so that the operation of fitting the memory card in position and removing it from the fitting space is further facilitated.

Preferably, said pointing device and said apparatus main body have respective wireless communication sections for exchanging data on the progress of operation.

Still preferably, said wireless communication sections are infrared ray communication sections so that the two sections are not mechanically connected. Thus, no connection failure will occur between the portable electronic apparatus and the pointing device if the pointing device is repeatedly moved. Additionally, since the two sections can communicate with each other without a wire, the pointing device is not subjected to any movement limitations and the operability of the pointing device is therefore enhanced. Still additionally, since the portable electronic apparatus shows a mechanically simplified configuration, the components of the apparatus are subject to less rigorous positional and design limitations to facilitate and simplify the design of the apparatus.

Preferably, said pointing device is a mouse.

With this arrangement, a mouse can be moved with the small apparatus main body to improve the portability and the anti-theft effect of the apparatus, while the mouse of known comparable apparatus normally has to be moved separately. Additionally, the internal space of the portable electronic apparatus is effectively exploited because the storage space for storing the pointing device is utilized as a memory card fitting space.

Preferably, the fitting space provided by moving or removing the pointing device has a smooth contact plane for being brought into contact with a memory card.

With this arrangement, the fitting space produced by moving or removing the pointing device provides a smooth contact plane for getting into contact with a memory card to facilitate the operation of inserting and taking out a memory card and protect the memory card against damage.

DESCRIPTION OF THE PREFERRED EMBODIMENTS

The present invention will be described further by referring to the accompanying drawings that illustrate preferred embodiments of the invention.

Embodiment 1

Figure 3:
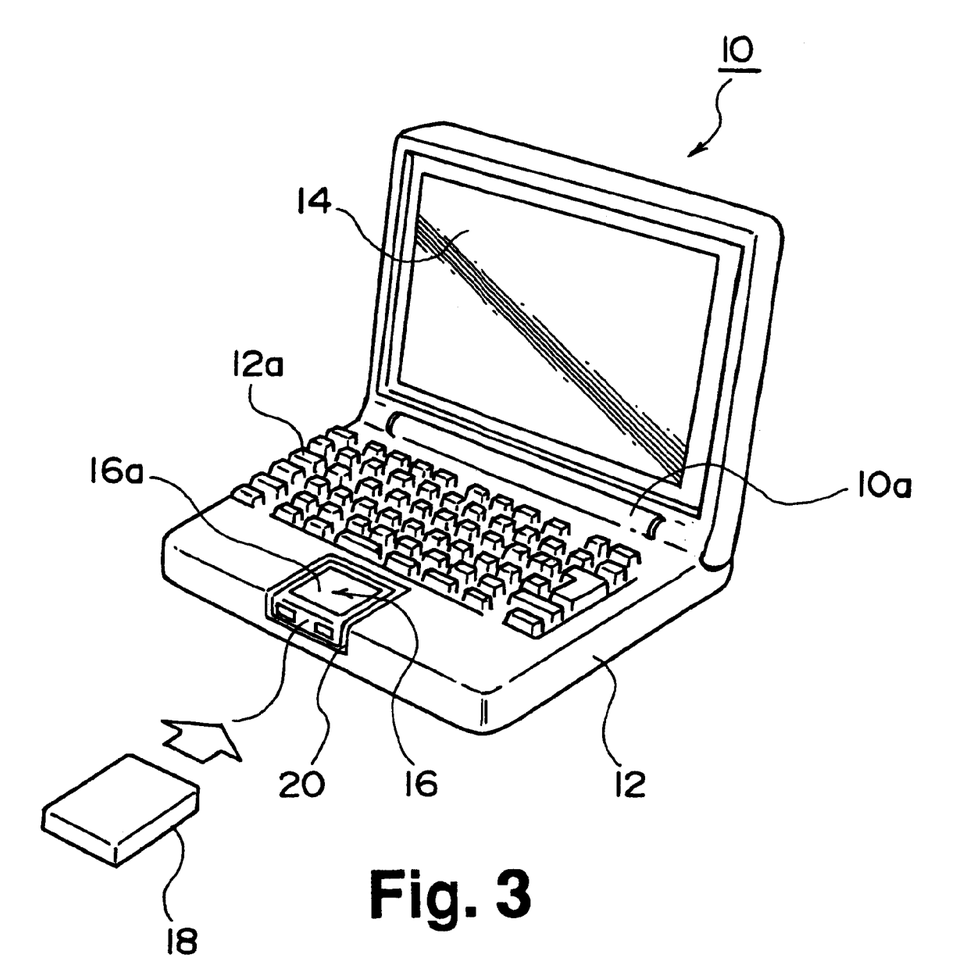
FIG. 3 is a schematic perspective view of embodiment 1 of the invention, which is a lap-top type personal computer having a pointing device.

FIGS. 3 through 7 illustrate a preferred embodiment 1 of the invention. FIG. 3 is a schematic perspective view of embodiment 1 of a portable electronic apparatus according to the invention, in this case a laptop type personal computer 10. The electronic apparatus 10 comprises an apparatus main body 12 including a keyboard 12a and a display 14 that are connected with each other by means of a hinge 10a. The display 14 is swung up for using said electronic apparatus 10 as shown in FIG. 3. A pointing device 16 is arranged near the front side of the keyboard 12a. The pointing device 16 has a sensor pad 16a comprising a pressure sensor. The operator of the electronic apparatus 10 can move a cursor displayed on said display 14 to select desired functions of the computer and carry out other operations by touching the sensor pad 16a with a finger tip.

Embodiment 1 is characterized in that a fitting space can be produced for a memory card 18 by moving the pointing device 16 within its storage section.

Said memory card 18 may be a thin card having a size of 5×8 cm and containing integrated circuits and magnetic stripes therein for storing data. The memory card 18 is provided at an end thereof (front end leading the card when inserted into the apparatus) with a terminal (not shown) that can be connected to a connector (see FIG. 4) arranged in the apparatus main body 12.

Figure 4:
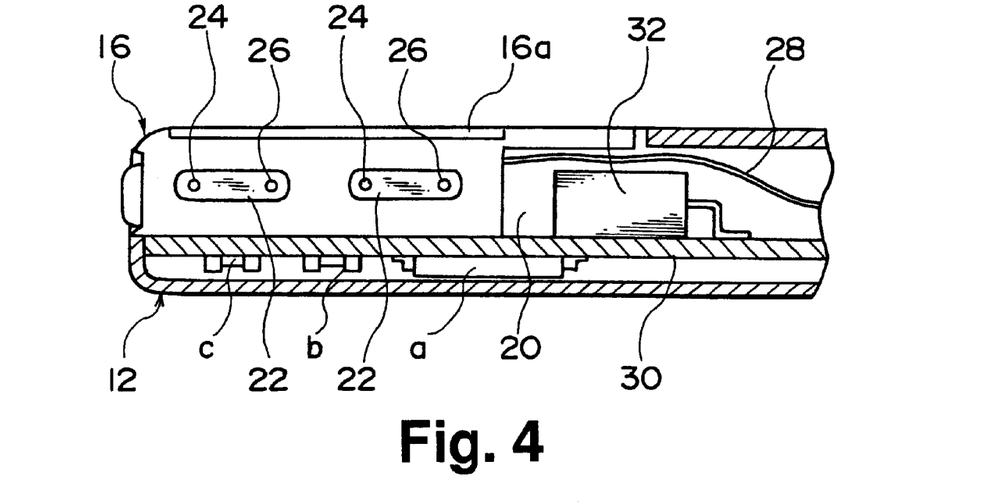
FIG. 4 is a cross sectional view of the pointing device storage section of embodiment 1.
Figure 5:
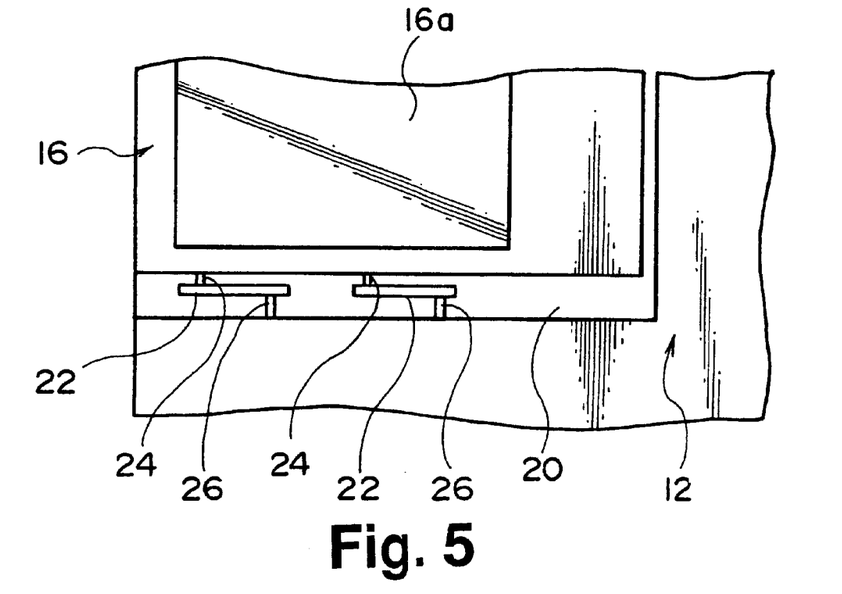
FIG. 5 is a plan view of the pointing device storage section of embodiment 1.

The storage section for storing the pointing device 16 and its peripheral areas will now be described along with the operation of fitting the memory card in position. Referring to FIGS. 3 and 4, the pointing device 16 is substantially box-shaped and stored in a storage section 20 formed within the apparatus main body 12. The pointing device 16 is connected to the inner wall of the storage section 20 by way of a pair of link rods 22 arranged at each lateral side of the device (only lateral sides are shown in FIGS. 4 and 5). More specifically, each of the link rods 22 is rotatably engaged at an end thereof with a pivot pin 24 projecting from the pointing device 16 and at the other end thereof with a pivot pin 26 projecting from the corresponding inner wall of the storage section 20. Thus, the link rods 22 and the pivot pins 24 and 26 provide a support mechanism for the pointing device 16. A flexible printed circuit (FPC) 28 is drawn out from the back of the pointing device 16 and connected to a connector (not shown) arranged on a circuit substrate 30 that is rigidly secured to the apparatus main body 12 for the pointing device 16.

Said pointing device 16 is stored in position in a manner as illustrated in FIGS. 3 and 4 when the memory card 18 is not fitted to the apparatus main body 12.

A memory card 18 is fitted to the apparatus main body 12 in a manner as described below. A connector 32 to be connected with the terminal (not shown) on the memory card 18 is arranged on the inner wall of said storage section 20. In embodiment 1, said circuit substrate 30 is utilized as part of the inner wall of the storage section 20 and the connector 32 is rigidly held onto said circuit substrate 30.

Figure 6:
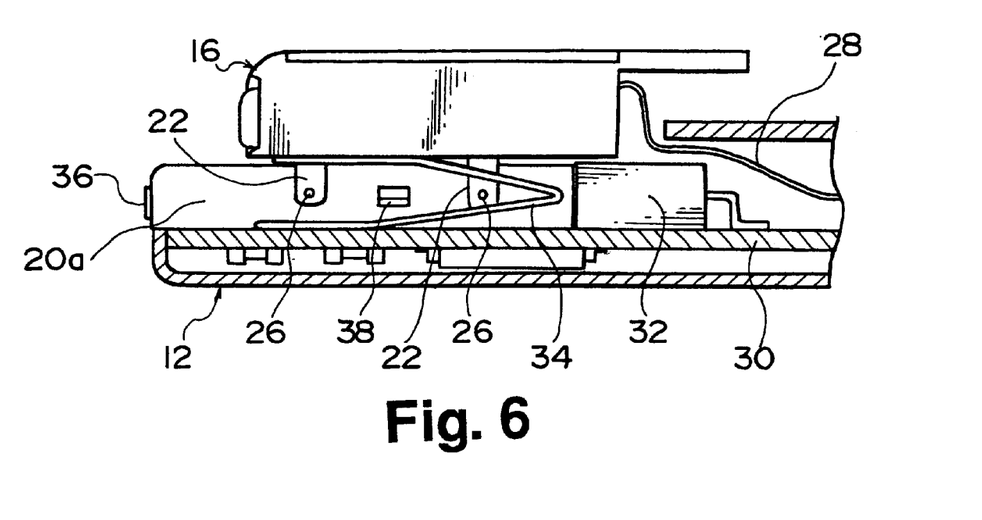
FIG. 6 is a cross sectional view of the pointing device storage section of embodiment 1 showing the pointing device in a pop-up state.
Figure 7:
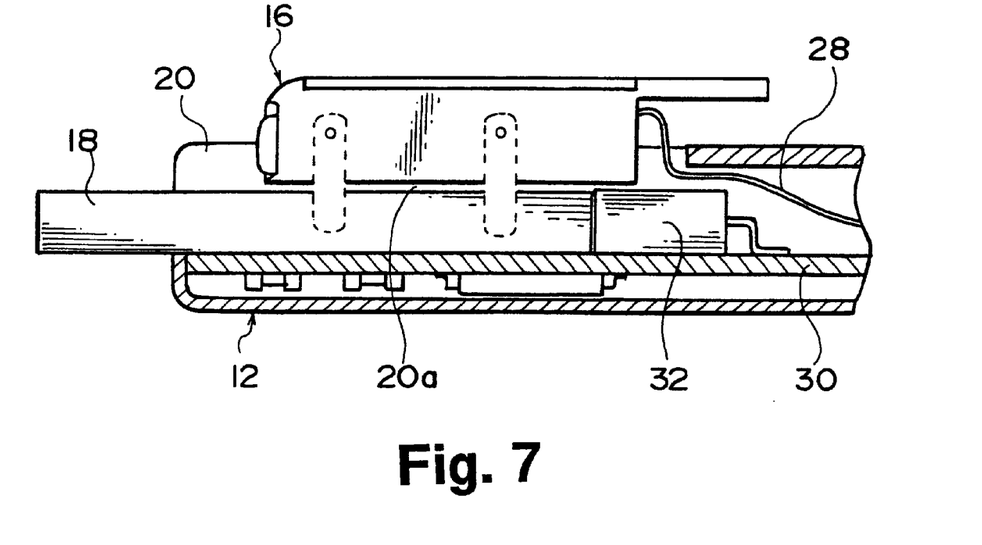
FIG. 7 is a cross sectional partial view of embodiment 1 showing a memory card fitted in position.

For fitting the memory card 18 in position, a fitting space is first prepared for the memory card 18 by making use of the storage section 20 for the pointing device 16. In the case of embodiment 1, the pointing device 16 is slid upward as shown in FIG. 6 as said link rods 22 are moved relative to the respective pivot pins 24 and 26. A space is produced in the storage section 20 as the pointing device 16 moves upward so that consequently said connector 32 becomes visible from the outside through the space, which serves as a fitting space 20a for the memory card 18. Then, as shown in FIG. 7, the memory card 18 is inserted into the apparatus main body 12 from the front side until the terminal (not shown) of the memory card 18 is connected to the connector 32.

Note that, in the case of embodiment 1, the circuit substrate 30 is used as part of the inner wall of the storage section 20 and, at the same time, as part of the fitting space 20a. Therefore, it is highly desirable to arrange a smooth plane on the portion of the circuit substrate 30 that operates as part of the storage section 20 (fitting space 20a) (and contacts with the memory card 18). A protector panel or a protector film made of a material equivalent to that of the case of the apparatus main body 12 (e.g., resin) is preferably used for producing the smooth plane. With the use of the smooth plane of a protector panel or film produced on the circuit substrate 30, the operation of inserting and taking out the memory card 18 can be conducted smoothly and the memory card 18 itself is protected against damage. Additionally, as shown in FIG. 4, parts a, b, c may be fitted to the rear side of the circuit substrate 30 when a protector panel or film is arranged on the front side of the circuit substrate 30 so that consequently the inside of the apparatus main body 12 can be effectively utilized for accommodating various components to allow the apparatus main body 12 to become thinner.

As shown in FIG. 6, a biasing member 34 for urging the pointing device 16 along its moving direction (upward in embodiment 1) may be arranged in the apparatus main body 12 at a position that does not interfere with the operation of fitting the memory card 18. A leaf spring is used for the biasing member 34 in FIG. 6. With such an arrangement, there is also provided a lock member 38 that is engaged with the pointing device 16 and retractable by means of a button 36 so that the biasing member 34 serves as a pop-up mechanism for popping up the pointing device 16 in the intended direction when the lock member 38 is retracted from its engaging position and disengaged from the pointing device 16. When the memory card 18 is not used, the pointing device 16 is brought back into engagement with the lock member 38 through an engaging hole thereof (not shown) simply by pushing down the pointing device 16 with a finger so that the pointing device 16 can easily recover its stored state.

Thus, since the storage section 20 for storing the pointing device 16 is also used as a fitting space 20a for fitting a memory card 18 in position, the overall space required in the apparatus main body 12 can be reduced significantly to allow the apparatus main body 12 to be down-sized and made thinner. Additionally, the memory card 18 can be fitted in position simply by popping up the pointing device 16 to produce the fitting space 20a for the memory card 18. Since the pointing device 16 may be popped up by a distance just slightly greater than the thickness of the memory card 18 (typically about 4 mm), the pointing device 16 can be handled and operated in the popped up position as easily as in the stored position. While the pointing device is so arranged as to be moved upward in embodiment 1, the mode and the direction of the sliding motion of the pointing device may be appropriately and differently selected. For example, it may be moved linearly along one or more than one guide rails or, alternatively, it may be rotated around an axis of rotation.

While the link rods 22 are visible from the outside for easy understanding in FIG. 5, they are actually hidden by a cover or the like.

Embodiment 2

Figure 8:
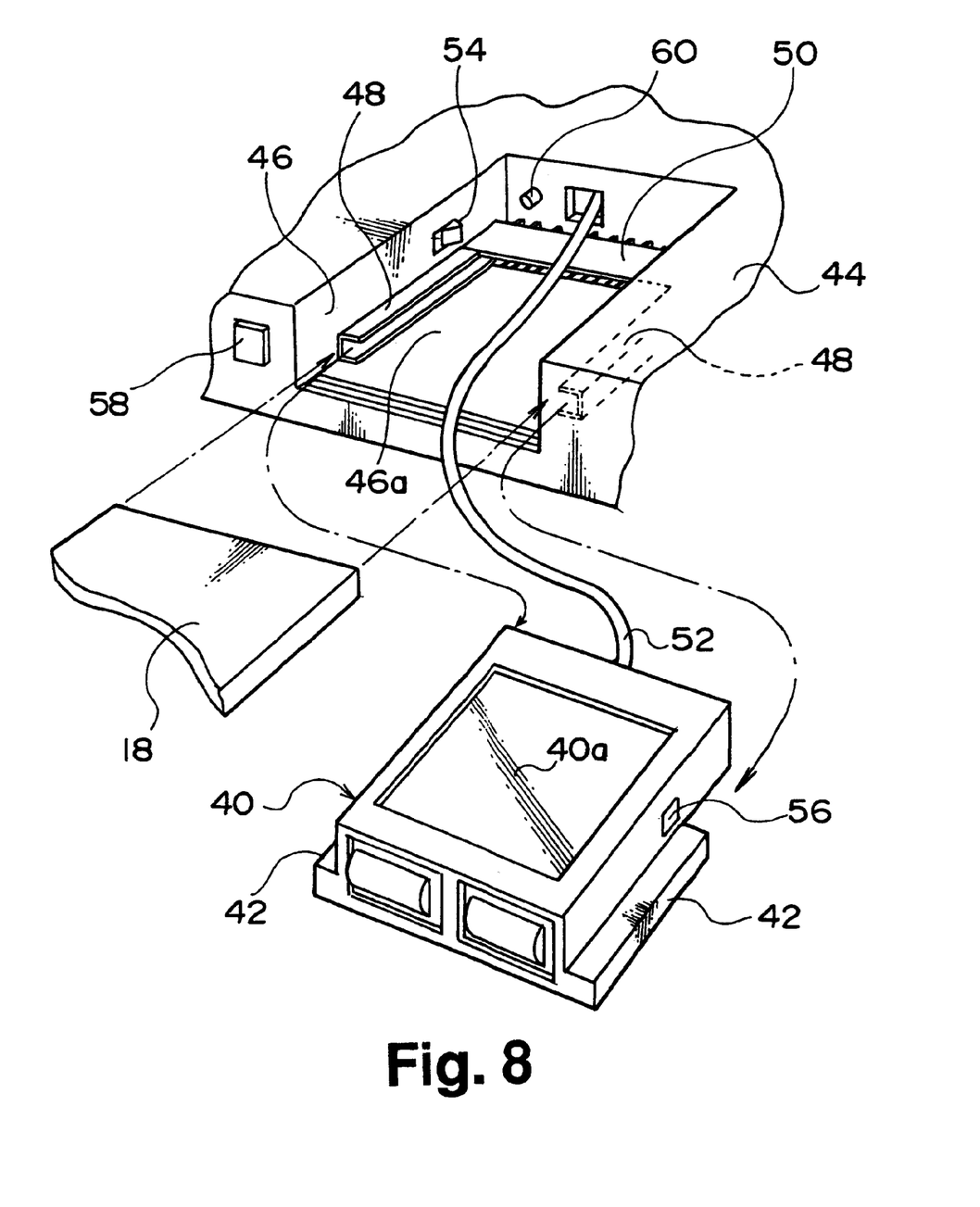
FIG. 8 is a perspective partial view of embodiment 2 of the invention showing a pointing device moving operation.

FIG. 8 illustrates a second embodiment of the invention. In embodiment 1 illustrated in FIGS. 3 through 7 and described above, the pointing device 16 is moved within the storage section 20 arranged in the apparatus main body 12 to provide a fitting space for the memory card 18. On the other hand, in embodiment 2 illustrated in FIG. 8, the main body of the pointing device can be separated from the storage section of the apparatus main body to produce a fitting space for a memory card. Note that only the pointing device storage section and its peripheral areas are shown in FIG. 8.

Like the pointing device 16 of FIG. 4, the pointing device 40 of FIG. 8 is provided on the upper surface thereof with a sensor pad 40a and along the lateral side thereof with respective guide bars 42 which can become engaged with respective guide rails 48 arranged in the storage section 46 provided in the apparatus main body 44 for storing the pointing device 40. A connector 50 extends between the guide rails 48 at an end thereof and can be connected to a terminal (not shown) of the memory card 18 to be stored there. The pointing device 40 is electrically connected to the apparatus main body 44 by means of a cable 52 having a predetermined length.

When no memory card 18 is fitted to the apparatus, the pointing device 40 can be put into the apparatus as the guide bars 42 of the pointing device 40 are moved along the respective guide rails 48 in the storage section 46. As the pointing device 40 is moved into the storage section 46, a pair of lock members 54 retractably arranged on the respective lateral walls of the storage section 46 (only one of which is shown) come into engagement with respective engaging holes 56 formed on the corresponding lateral sides of the pointing device 40 (only one of which is shown). As a result, pointing device 40 is rigidly secured to the apparatus main body 44 to become ready for use near the keyboard as in the case of FIG. 3. The cable 52 is preferably wound in the apparatus main body 44 by means of a cable winding device (not shown) when the pointing device 40 is stored in the storage section 46.

For fitting the memory card 18 into the apparatus, on the other hand, the pointing device 40 is first taken out of the storage section 46. More specifically, an actuator button 58 is depressed to retract the lock members 54 from the respective engaging holes 56. The operation of taking out the pointing device 40 can be facilitated if a biasing member 60 is arranged on the inner wall of the storage section 46 to urge the pointing device 40 to move toward the front side by means of spring or a biasing bar. Next, the pointing device 40 is moved out of the storage section 46 and the storage section 46 is ready to operate as a fitting space 46a for the memory card 18. In embodiment 2, the guide rails 48 for receiving the respective guide bars 42 are also used to guide the memory card 18 into the fitting space 46a. Therefore, the pointing device 40 is required to have a width equal to that of the memory card 18 or, alternatively, an adaptor or some other means will have to be provided to make the memory card 18 to be properly guided by the guide rails 48. Still alternatively, some other guide mechanism that can disregard the width of the pointing device and that of the memory card may be employed.

In this way, the pointing device 40 can be moved out of the storage section 46 to provide a fitting space 46a for the memory card 18 so that the memory card 18 does not need an independent fitting space specifically arranged for it and therefore consequently the apparatus main body can be further down-sized and made thinner. Additionally, since the pointing device 40 can be totally moved out of the storage section, the fitting space and the position for receiving the memory card 18 can be visually scrutinized to facilitate the operation of inserting and pulling out the memory card.

If the circuit substrate of the apparatus main body 44 of embodiment 2 is used as part of the storage section 46, a smooth plane is preferably formed by means of a protector panel or film on that part of the circuit substrate that operates for the storage section 46 as in the case of embodiment 1. While the connector 50 is arranged in contact with the rear ends of the guide rails 48 in embodiment 2, it may alternatively be separated from the guide rails 48.

Embodiment 3

Figure 9:
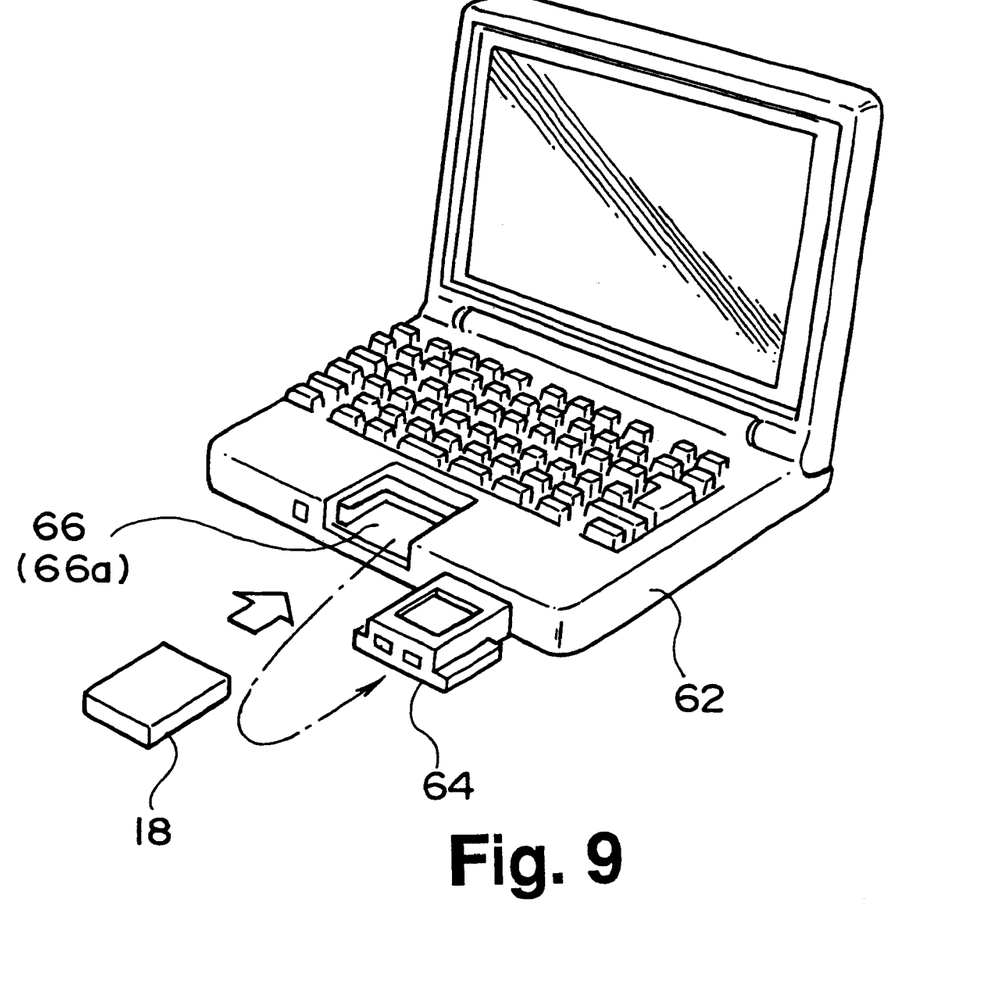
FIG. 9 is a perspective partial view of embodiment 3 of the invention showing a pointing device moving operation.
Figure 10:
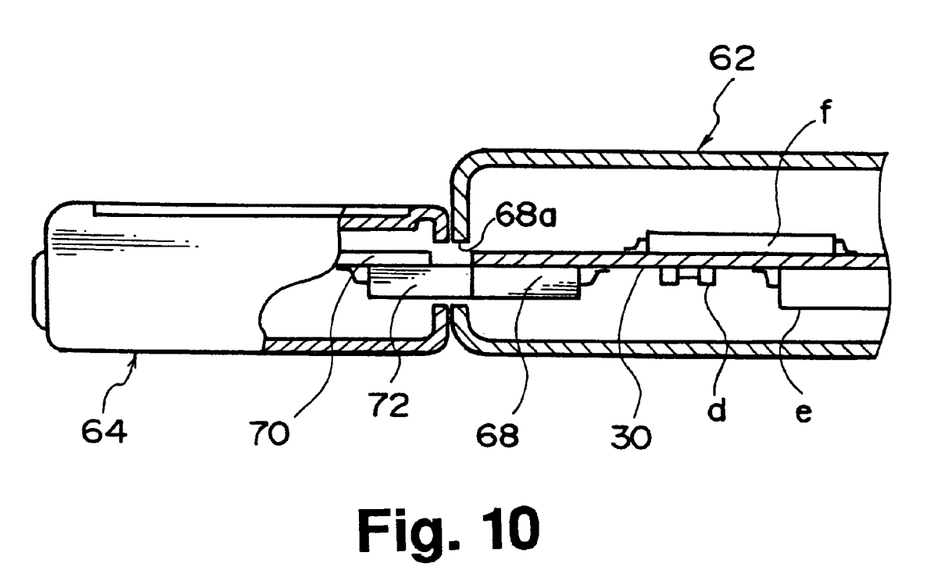
FIG. 10 is a cross sectional partial view of embodiment 3 showing the connection of the pointing device and an external connector.

FIGS. 9 and 10 schematically illustrate a third embodiment of the invention. In embodiment 2 illustrated in FIG. 8 and described above, the pointing device 40 remains to be connected to the apparatus main body by way of the cable 52 when it is moved out of the storage section 46. Contrary to this, in the case of embodiment 3 illustrated in FIGS. 9 and 10, the pointing device can be connected to the apparatus main body without using a cable.

The storage section 66 of the apparatus main body 62 for storing the pointing device 64 of this embodiment has a configuration substantially same as that of the storage section of embodiment 2 and will not be described in detail here. Since no cable is arranged for the pointing device 64 of embodiment 3, the pointing device 64 is connected to the apparatus main body 62 by means of different connectors when the pointing device 64 is stored in the storage section 66 and when it is separated from the storage section 66. More specifically, the pointing device 64 is provided with an internal connector arranged on the inner wall of the storage section 66 and an external connector arranged at a position other than said storage section 66, that can be the position where the pointing device 64 is located in FIG. 9.

When no memory card 18 is fitted to the apparatus main body, the pointing device 64 is stored in the storage section 66 and connected to an internal connector (not shown) so that the pointing device 64 is in a state as shown in FIG. 3 and ready for use. When, on the other hand, a memory card 18 is used, the pointing device 64 is moved out of the storage section 66 and connected to an external connector (not shown) at the position shown in FIG. 9. Thus, the fitting space 66a for a memory card 18 is produced there and the pointing device 64 can be used at the position where it is connected to the external connector.

FIG. 10 is a cross sectional view of the connecting section of the pointing device 64 shown in FIG. 9. As seen from FIG. 10, the external connector 68 is arranged on a circuit substrate 30 along with other parts d, e, f, . . . and its front end is directed to a connector aperture 68a, the circuit substrate 30 being arranged inside the apparatus main body 62. On the other hand, another connector 72 is arranged along with other parts not shown on another circuit substrate 70 connectable to said connector 68, said circuit substrate 70 being arranged within the pointing device 64.

Since no cable is connected to the pointing device 64 of embodiment 3, no cable winding device is arranged in the apparatus main body 62 thereby allowing the intention to have a simple configuration. Additionally, the pointing device 64 is immune to the problem of a broken cable. Still further, since the fitting space 66a for fitting the memory card 18 produced there by removing the pointing device 64 from the storage section 66 does not include a cable or related parts, the memory card 18 can be positionally confirmed within the apparatus main body and moved out and in smoothly without difficulty. The connector aperture 68a is preferably provided with a removable shutter for protecting the inside of the apparatus main body 62 against dirt and foreign objects when the pointing device 64 is not connected to the external connector 68.

Embodiment 4

Figure 11:
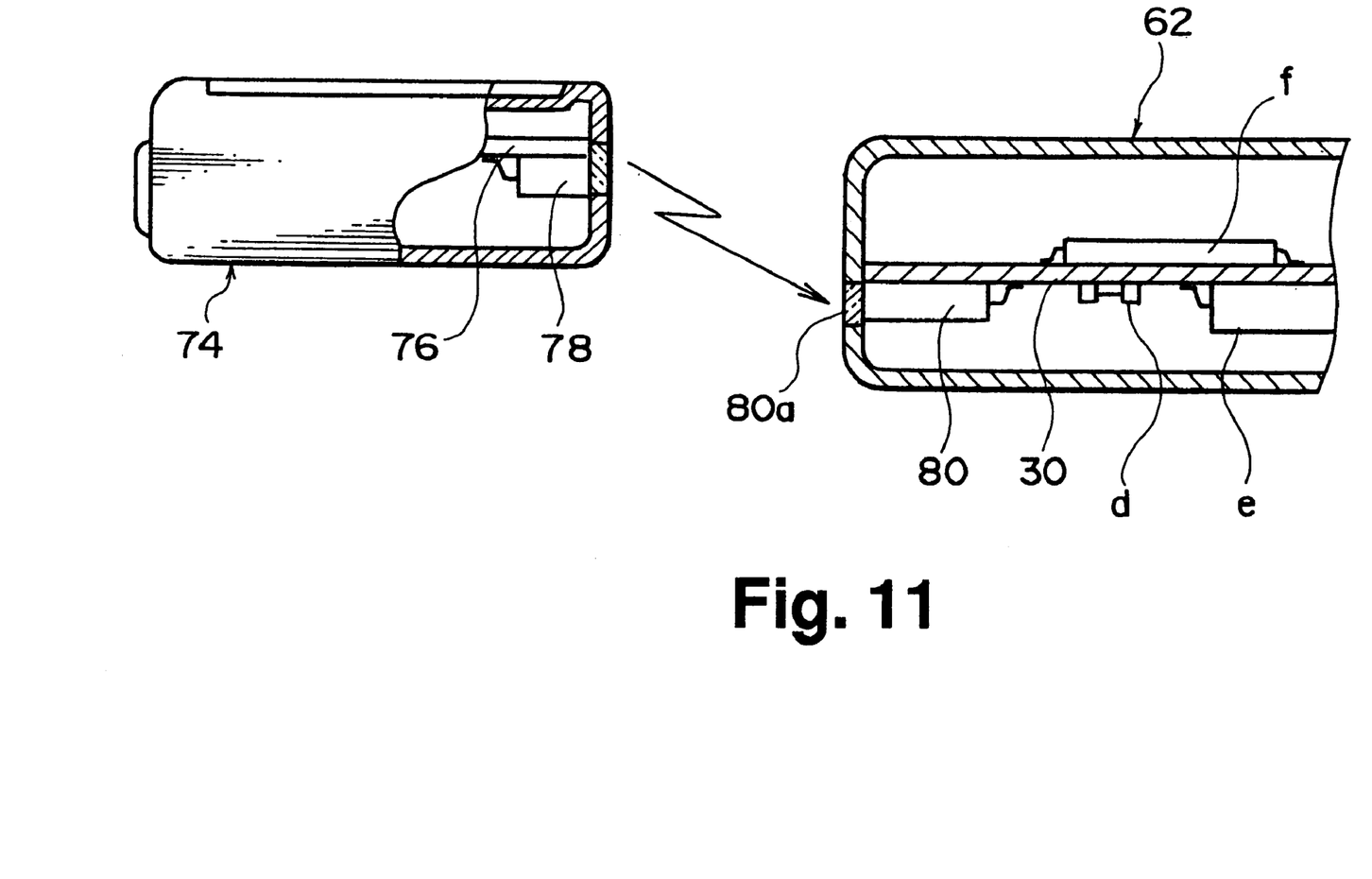
FIG. 11 is a cross sectional partial view of embodiment 4 of the invention showing wireless communication between the pointing device and the apparatus main body.

FIG. 11 illustrates a fourth embodiment of the invention. While the pointing device 64 is connected to the circuit substrate 30 of the apparatus main body 62 by way of an external or internal connector in embodiment 3 illustrated in FIGS. 9 and 10, the pointing device of embodiment 4 is communicable with the apparatus main body by way of a wireless communication channel realized by using a radio wave or infrared rays. Since the communication channel using a radio wave has the same configuration as the one using infrared rays, only the latter will be described here.

As seen from FIG. 11, an infrared ray signal transmitting section 78 is arranged on an internal substrate 76 of the pointing device 74 along with other parts. On the other hand, an infrared ray signal receiving section 80 is arranged on the circuit substrate 30 of the apparatus main body 62 along with parts d, e, f, . . . . Note that a signal receiving window 80a of the signal receiving section 80 has to be arranged at a position on the apparatus main body 62 where the signals transmitted from the signal transmitting section 80 are received without hindrance. While the pointing device 64 of FIG. 11 is located at the position same as that of its counterpart connected to the external connector illustrated in FIG. 9, it may be located at any position near the display so long as no obstacle exists between them. Another signal receiving window 80a may be arranged in the storage section 66 (see FIG. 9) for storing the pointing device 74 arranged within the apparatus main body 62. If such is the case, the signal receiving section 80 arranged in the apparatus main body 62 can be used both when the pointing device 74 is stored in the storage section 66 and when it is moved out of the storage section 66 to further simplify the overall configuration of the apparatus.

When no memory card is fitted to the apparatus main body, the pointing device 74 is stored in the storage section 66 so that the pointing device 74 is in a state as shown in FIG. 3 and ready for use. The signal receiving section in the storage section is located either close to or in contact with and vis-a-vis the signal transmitting section 78 of the pointing device 74 under this condition. For fitting a memory card in position in the apparatus main body 62, on the other hand, the pointing device 74 is moved out of the storage section to produce a memory card fitting space and then the memory card is inserted into the space as in the case of FIG. 9. The moved out pointing device 74 can be used with the apparatus main body 62 if it is separated from the latter so long as it is found within the service area of the communication system using infrared rays. It is also obvious that the apparatus main body 62 may be provided with the pointing device holding mechanism in order to use the pointing device under the positional condition as illustrated in FIG. 9.

Figure 12:
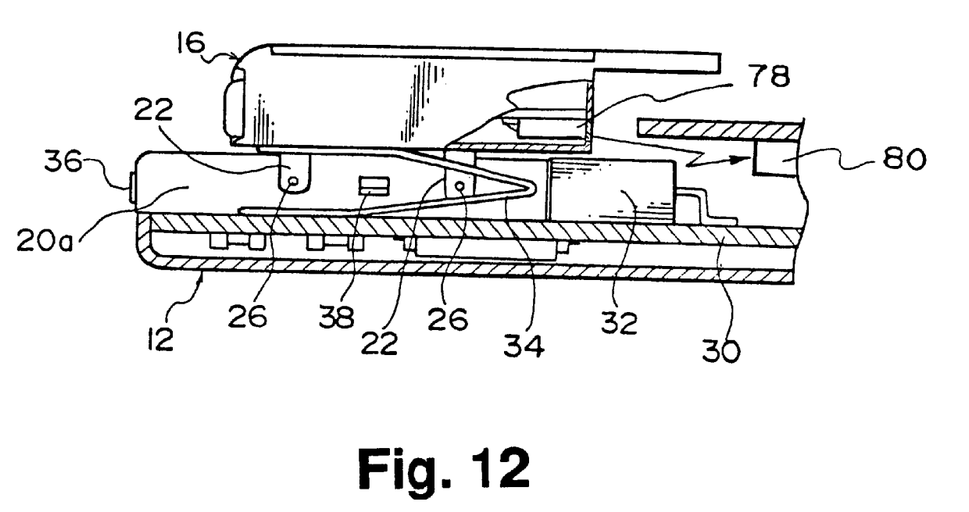
FIG. 12 is a cross sectional partial view of embodiment 4, also showing wireless communication between the pointing device and the apparatus main body.

Such a wireless communication arrangement for the pointing device and the apparatus main body may be applied to a case where the pointing device is moved within the storage section as described earlier by referring to embodiment 1. More specifically, as shown in FIG. 12, a signal transmitting section 78 is arranged on the pointing device 16 while a signal receiving section 80 is arranged in the storage section 20 so that the pointing device 16 may be operated by way of the communication channel comprising the signal transmitting and receiving sections. Note that if infrared rays are used for communication the signal transmitting section 78 and the signal receiving section 80 have to be arranged at respective positions where the connector 32 and other components may not interfere with the communication channel.

On the other hand, if radio waves are used for communication, the signal transmitting and receiving sections located respectively in the apparatus main body and the pointing device are free from positional limitations. In other words, they may be arranged at any appropriate positions.

Thus, when the apparatus main body and the pointing device are made communicable with each other by means of wireless communication, they are freed from mechanical connecting means to eliminate any connection failure that can arise between them and enhance the operability of the apparatus. Additionally, limitations imposed on the design of the apparatus main body and the pointing device and their positional relationship may be reduced.

Embodiment 5

Figure 13:
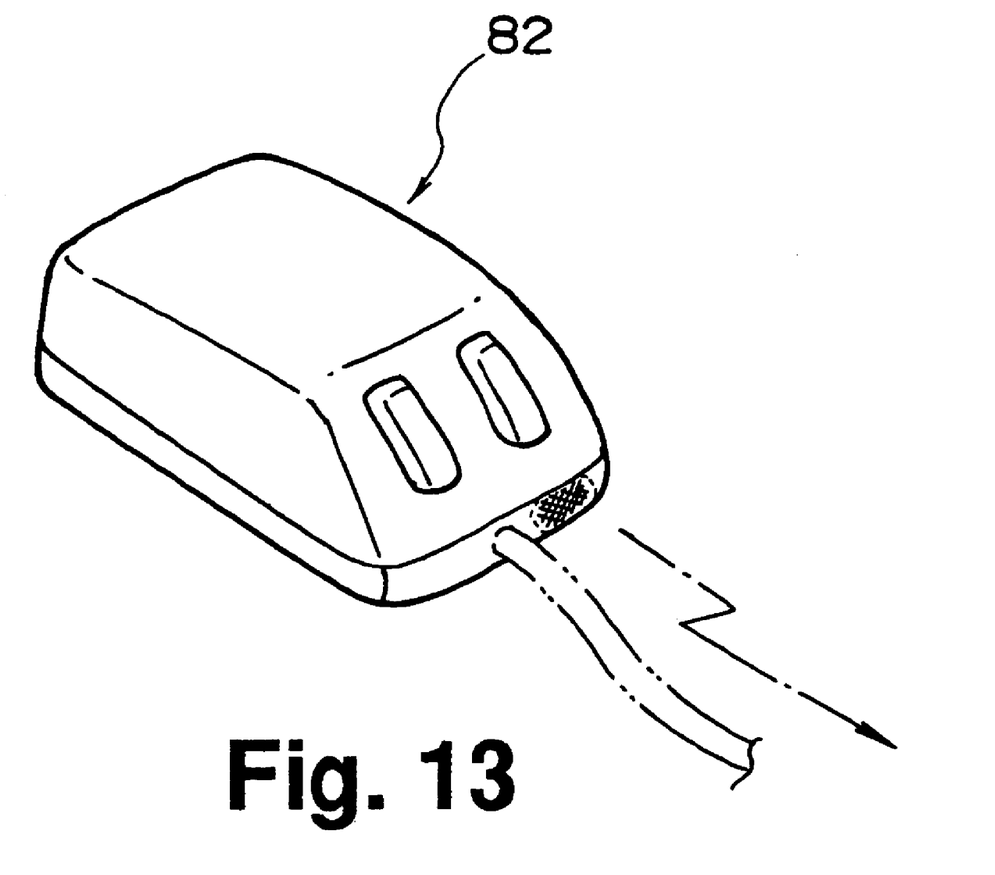
FIG. 13 is a perspective view of a mouse that can be used for embodiment 5, of the invention.

While each of embodiments 2 through 6 described above involve the use of a sensor pad comprising a pressure sensor for the pointing device, the sensor pad may be replaced by a mouse 82 shown in FIG. 13 as a separable pointing device. If a mouse 82 is used, it must be separated from the apparatus main body regardless of whether or not a positionally independent component if a memory card is used, although the storage section for storing the mouse 82 may be utilized as the memory card fitting space to maintain the advantage of the preceding embodiments. If the pointing device is replaced by a mouse, it may be connected to the apparatus main body by way of a cable as in the case of embodiment 2 or, it may be made communicable with the apparatus main body by way of a wireless communication system using a radio wave or infrared rays as in the case of embodiment 4.

Thus, a mouse that has hitherto been transported independently from the apparatus main body can now be moved with the latter to improve the overall portability of the apparatus to say nothing of the anti-theft effect of such an arrangement. Additionally, since the storage section for storing the mouse is utilized as a memory card fitting space, the internal space of the apparatus main body can be fully exploited to allow the apparatus main body to be further down-sized and made thinner.

While the present invention is described in terms of a lap-top type personal computer in each of the above embodiments, it may be applied to any other portable electronic apparatus such as a portable terminal unit comprising a pointing device and a memory card to realize a same effect.

While the pointing device is either a sensor pad or a mouse in each of the above described embodiments, any other appropriate pointing device such as a track ball or a joy stick may alternatively be used without losing the advantages of the invention. Likewise, while the pointing device storage section is located at a front middle position of the apparatus main body in each of the above embodiments, the storage section may alternatively be arranged at an appropriate edge or any other position of the apparatus main body.

What is claimed is:

1. A portable computer apparatus having a pointing device, said apparatus comprising:
   a portable computer body having an operation key;
   a storage section arranged in said portable computer body of the apparatus for storing said pointing device;
   a support mechanism for movably supporting said pointing device; and
   a connector arranged on an inner wall of said storage section for removably connecting a memory card to said apparatus;
   said pointing device being movable while still being operably connected to said apparatus within said storage section in order to provide a fitting space for fitting said memory card to said connector.

2. A portable computer apparatus according to claim 1, wherein the pointing device provides a fitting space for fitting said memory card by moving a slide of the device.

3. A portable computer apparatus according to claim 2, wherein said support mechanism comprises a pop-up mechanism for sliding the pointing device with a pop-up motion.

4. A portable computer apparatus according to claim 1, wherein said pointing device provides a fitting space for fitting said memory card by protruding from said apparatus.

5. A portable computer apparatus according to claim 1, wherein the fitting space provided by moving or removing the pointing device has a smooth contact plan for being brought into contact with said memory card.

6. A portable computer apparatus having a pointing device, said apparatus comprising:
   a portable computer body having an operation key;
   a storage section arranged in said portable computer body of the apparatus for storing said pointing device; and
   a connector arranged on an inner wall of said storage section for removably connecting a memory card to said apparatus;
   wherein:
      said pointing device is detachable from the portable computer body such that said storage section provides a fitting space for fitting said memory card to said connector,
      said pointing device and said memory card are individually operably connected to the apparatus main body and said connector respectively when said pointing device is detached from said portable computer body, and
      said pointing device is supported independent of the presence of said memory card.

7. A portable computer apparatus according to claim 6, wherein:
   the portable computer body has an external connector located outside said storage section for connecting the pointing device to the connector; and
   said pointing device can be connected to said external connector at the time of fitting the memory card in position.

8. A portable computer apparatus according to claim 6, wherein said pointing device and said portable computer body have respective wireless communication sections for exchanging data on the progress of operation.

9. A portable computer apparatus according to claim 7, wherein said wireless communication sections are infrared rays communication sections.

10. A portable computer apparatus according to claim 4, wherein said pointing device is a mouse.

11. A portable computer apparatus according to claim 6, wherein the fitting space provided by moving or removing the pointing device has a smooth contact plane for being brought into contact with said memory card.

* * * * *